United States Patent [19]

Kadah

[11] Patent Number: 4,991,049
[45] Date of Patent: Feb. 5, 1991

[54] ANTI-SHORT-CYCLE CIRCUIT

[76] Inventor: Andrew S. Kadah, 5000 Henneberry Rd., Manlius, N.Y. 13104

[21] Appl. No.: 420,310

[22] Filed: Oct. 12, 1989

[51] Int. Cl.⁵ ............................................. H02H 11/00
[52] U.S. Cl. ......................................... 361/28; 361/22; 361/29; 361/75; 307/141; 307/141.4; 307/632
[58] Field of Search ...................... 361/22, 24, 28, 29, 361/75, 10, 94; 307/141, 141.4, 141.8, 600, 605, 632; 62/157, 158, 231

[56] References Cited

U.S. PATENT DOCUMENTS

| 3,553,495 | 1/1971 | Shaugnessy | 307/632 |
| 3,742,302 | 6/1973 | Neill | 361/22 |
| 3,755,695 | 8/1973 | Krick et al. | 307/141.4 |
| 3,883,782 | 5/1975 | Beckwith | 361/110 |

Primary Examiner—Todd E. DeBoer
Attorney, Agent, or Firm—Wall and Roehrig

[57] ABSTRACT

A protective time delay delay circuit delays energization to an electric load until a predetermined time has elapsed from a previous deenergization. A transistor has its emitter connected to an ac conductor and has its base coupled to an RC timing circuit. The collector is connected to the gate of a triac whose current electrodes are coupled to the thermostat conductor and to a load device. A small resistor and a zener can be connected to the transistor to provide brownout protection. A temperature sensitive resistor can be included to increase or decrease the lockout period as a function of temperature. This resistor can be remotely mounted in thermal proximity to the load to be protected. A thermistor placed in parallel to latching capacitor can provide thermal overload protection.

15 Claims, 6 Drawing Sheets

ANTI-SHORT-CYCLE CIRCUIT

BACKGROUND OF THE INVENTION

This invention relates to protective time-delay circuits, and is more especially directed to circuits which delay the energization of an electrical device until a predetermined delay time has passed after a previous deenergization. These circuits are known as anti short-cycle timers.

It is common in air conditioning circuits to protect the ac motor of the air conditioner compressor with a delay-on-make time delay device. When the compressor has been running, a pressure head builds up. This head bleeds off slowly after the compressor stops. The presence of the head produces a reverse torque on the compressor until the head has decayed. Attempting to restart the compressor motor in the presence of the pressure head can result in stall and overheating, or can result in the motor running in reverse. The danger of reverse running is especially problematic for scroll compressor units. The delay circuit holds up energization of the compressor for a time long enough for the pressure head to drop, and then closing to energize the motor. This delay time is typically one to several minutes.

Unfortunately, a delay-on-make protective circuit will delay power-up of the motor not only after it has been shut off recently, but also when the motor has been off for an extended time and no pressure head exists. This produces unnecessary delays when there is a call for cooling. For example, an individual entering an uncomfortably warm or stuffy room, and turning the thermostat to a cooling position will find that the air conditioner does not respond because of this built-in delay. Then, the individual as often as not will attempt to reset the thermostat. However, each time he or she does so, the delay time is reinitiated, further delaying the onset of cooling.

Other attempts at protective circuits for this purpose involve a delay timer that commences when a motor or load device is switched off, so that a delay in operation will be experienced only if the motor or load device is turned off and then turned back on immediately. However, these devices are invariably quite complex, involving numerous discrete elements, and typically including four or more transistors, numerous capacitors, zeners, and resistors, which make the devices difficult to design and expensive to build.

Another problem unsolved is that of bounce. That is, if a mercury thermostat is used, each time the thermostat turns on, the ball of mercury in it initially makes intermittent contact with the thermostat contacts. This makes and breaks contact a number of times, which initiates and breaks the timing of the protective delay circuit. Consequently, there is invariably a delay in cooling after a call for cooling, even when there has not been recent compressor operation.

OBJECTS AND SUMMARY OF THE INVENTION

It is an object of this invention to provide a protective circuit which is of simple design and which permits energization of a load device after the device had been turned off for a selected period of time.

It is another object to provide such a protective circuit which avoids the drawbacks of the prior art It is a further object of this invention for the protective circuit also to provide "brownout" protection, i.e., to prevent energization when the line ac voltage drops.

Another object is to provide a protective circuit with the additional feature of temperature sensitivity.

According to an aspect of the invention, the protective circuit delays power up of an air conditioner compressor or other load until a predetermined delay time has elapsed following a previous deenergization. In the protective circuit a triac device has power electrodes that connect a first ac conductor, e.g. the thermostat Y conductor, to a load such as the motor connector relay, which is in turn connected to a second ac conductor, such as the thermostat common conductor. A transistor has its emitter coupled, through an optional rectifying diode, depending upon device characteristics, a resistor, and a zener, to the first ac conductor, and has its collector connected to the gate electrode of the triac device. There is a latching capacitor connected between the triac gate electrode and the second ac conductor, and a capacitive timing circuit, e.g., a timing capacitor and timing resistance in parallel, connected between the base of the transistor and the second ac conductor. A thermistor can be included to provide direct temperature sensing and additional thermal protection.

When the thermostat closes, half-wave rectified dc is applied to the emitter of the transistor, and this passes through the base-emitter junction to charge up the timing capacitor. Current also flows out the collector to the gate of the triac which latches it on. The latching capacitor holds the triac latched on until ac current is interrupted.

Once the timing capacitor is charged up, the base-emitter current ceases, which turns the collector off also. However, the triac, once gated, is held latched until the thermostat opens. As long as the triac is latched on, some current flows to the triac gate. This passes through the collector-base junction, which serves a poor, but adequate rectifier diode, to the timing capacitor to keep it charged.

When the thermostat opens, the ac voltage on the Y conductor disappears. The charge on the timing capacitor bleeds off slowly through the timing resistor. If ac voltage is applied before this capacitor discharges, the transistor remains biased off and the triac will not gate. However, the capacitor continues to discharge until it can again receive the base emitter current, which turns the gating current on to latch the triac.

The RC decay time for the timing capacitor and resistor can be selected for a time sufficient to ensure pressure head bleed in the compressor. In modern air conditioner systems, a delay time of three to ten seconds is usually adequate. Any real capacitor will have some charge leakage, so the timing resistor can be omitted if desired.

Brownout protection is provided by a resistance of modest value (e.g. 220 to 1000 ohms) in series with the emitter electrode. This will preclude turn on of the transistor where the ac line voltage is insufficient, thus protecting the load device from low-voltage conditions. A more precise selection of the critical brown-out voltage level can be achieved by a zener in series with this resistor and with the emitter electrode. Transient protection is provided by a capacitor across the first and second ac conductors in parallel with the circuit formed by the triac and load device.

The transistor characteristics and values of the capacitors and resistors can be selected so that at least a few half-waves must be present on the Y conductor before the timing capacitor is charged sufficiently to bias off the transistor. Additionally, a few half waves may be required to turn "ON" the triac, which will prevent intermittence or bounce from false-starting the compressor and providing erroneous lock out time.

The above and many other objects features and advantages of this invention will be more fully appreciated from the ensuing description of a preferred embodiment, to be read in connection with the accompanying Drawing.

Detailed Description of the Preferred Embodiment

Figure 1:
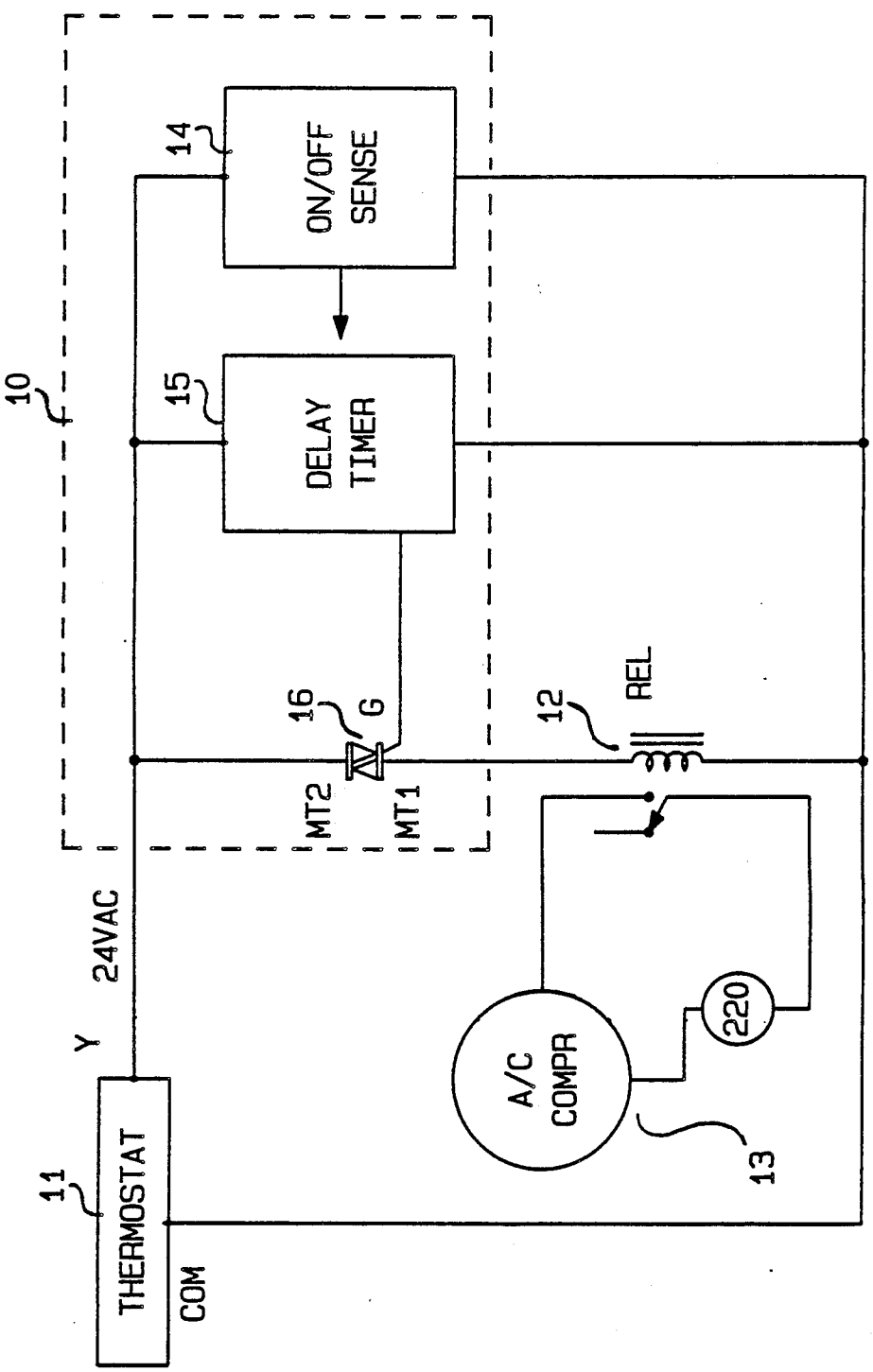
FIG. 1 is a block diagram schematic of a basic anti-short-cycle timer circuit

With reference to the Drawing, FIG. 1 illustrates the basic principles behind an anti-short cycle timer circuit 10, which can operate according to the present invention. The circuit 10 is connected to a Y conductor of a thermostat 11, which provides 24 volts AC when there is a call for cooling. Other systems run at 115 vac or higher voltages, and the anti-short cycle timer could be constructed to operate at that voltage. The conductors can carry from 3 vac to 460 vac. The circuit 10 connects to a relay 12 which can be, e.g., an electromechanical coil or optically coupled device, and which is in turn coupled to a COM or common conductor of the thermostat. In basic terms the anti-short-cycle timer circuit 10 has an ON/OFF sense detector 14 that senses the presence or absence of voltage on the Y conductor and a delay timer 15 that starts its timing cycle when the detector 14 senses a change of state from ON to OFF. The timer 15 gates a triac 16 when an ON state is detected but only after the predetermined delay time has elapsed since a deenergization, i.e., after a previous change from ON to OFF. The triac 16 has one power electrode connected to the Y conductor and another power electrode connected to the connector relay 12.

The triac 16 will remain latched on until the voltage on the Y conductor disappears. Then the prescribed delay time must elapse before a gate voltage can be applied to the triac 16 to energize the relay 12 and load. In this case the load can be constituted as a 220 volt AC compressor motor 13 for an air conditioner.

Figure 2:
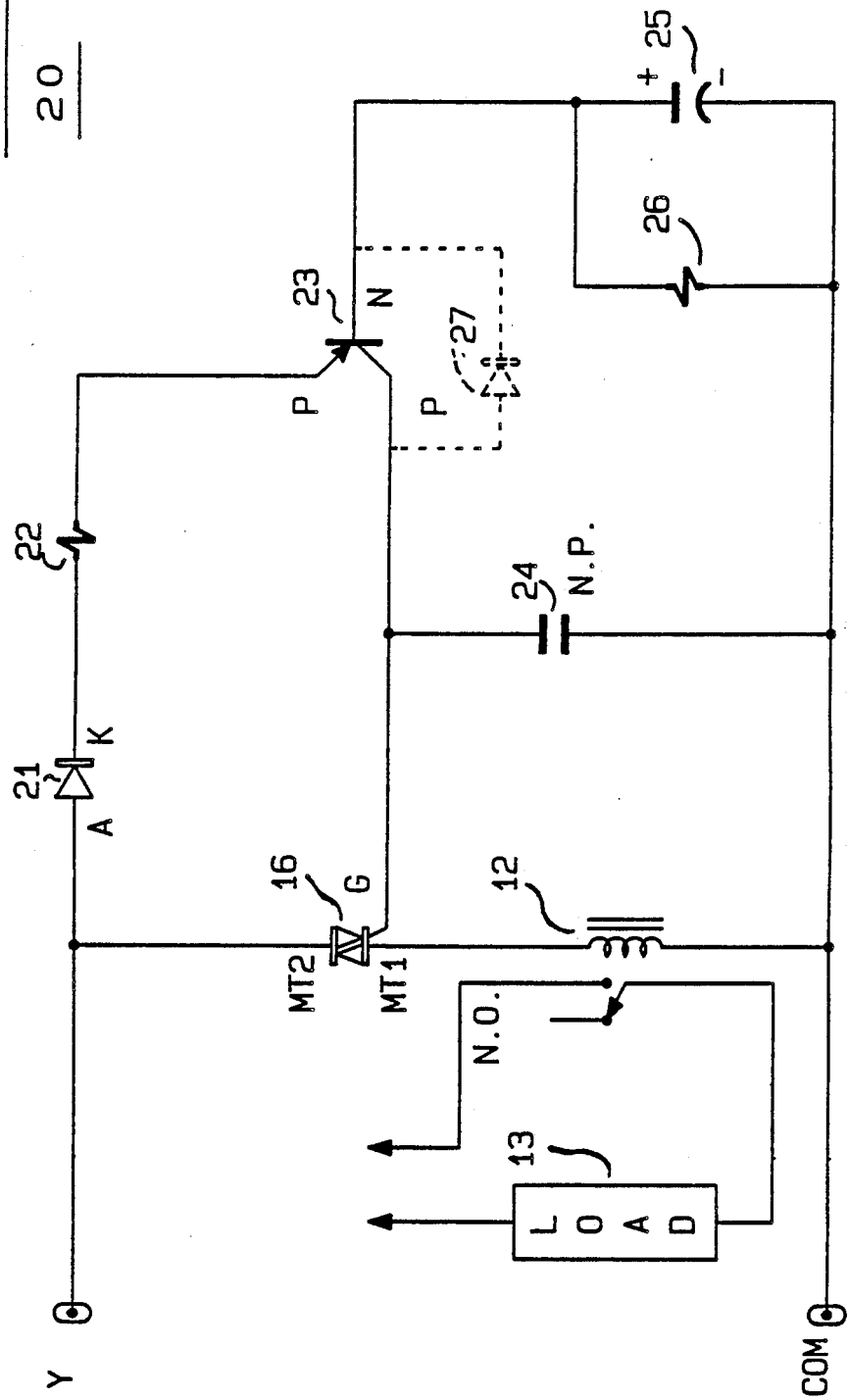
FIG. 2 shows a protective time delay circuit according to a first embodiment of the present invention.

One practical realization is shown in FIG. 2 as an anti-short cycle timer circuit 20 according to an embodiment of the invention. In this circuit 20, a rectifier diode 21 has its anode connected to the thermostat Y conductor and its cathode coupled through a brown out resistor 22 to an emitter of a PNP-type junction transistor 23. The resistor 22 can have a value on the order of 10 ohms to 1000 ohms. The transistor 23 has its collector coupled to the gate electrode of the triac 16 and to a latching capacitor 24 connected between the gate electrode and the common conductor COM. This capacitor 24 can have a value, e.g., 10 microfarads, non-polarized, at a 50 volt rating, for 24 volt circuits. A timing circuit is constituted by a timing capacitor 25 connected between the base of the transistor 23 and the common conductor COM and a parallel timing resistance 26 also coupled to the base and to the conductor COM. The capacitor 25 can have a value in the range, e.g., 1 to 100 microfarads, polarized, at a 50 volt rating, and the resistance 26 can have a value from about 1K to 1M, or may be a temperature sensitive value NTC or PTC thermistor. The capacitor 25 and resistance 26 are selected to have a suitable RC time constant for the intended application, and in this example that time constant can be between three and ten seconds. For other applications the delay time can be from 0.1 seconds to ten minutes The circuit 20 operates generally as follows:

Initially, when there is no voltage on the Y conductor, there is also no charge on the capacitor 25 and the triac 16 is latched off.

When the thermostat closes to call for cooling, a 24 volt AC wave appears on the Y conductor. This passes through the diode 21, resistor 22, and base-emitter junction of the transistor 23. The base-emitter current will cause an emitter-collector current to flow to the capacitor 24 and gate electrode of the triac, and will turn on the triac 16 to actuate the relay 12. Once on, the triac remains latched until the Y conductor is switched OFF at the thermostat.

The timing capacitor 25 charges, through the emitter of the transistor 23, until its plate voltage is high enough to bias off the transistor 23. Then, some current will continue to flow from the triac gate electrode through the collector-base junction, when it is forward biased, to maintain the charge on the timing capacitor 25. The collector-base junction serves as a poor, but adequate rectifier diode, indicated in ghost lines as diode 27.

When the thermostat switches OFF, the capacitor 25 will gradually discharge through the resistance 26. If the thermostat turns ON before the predetermined delay time elapses, the voltage on the capacitor 25 will bias the transistor off, and hold it off until the predetermined delay time has elapsed since the thermostat turned OFF previously. The triac 16 cannot gate until the capacitor 25 has discharged sufficiently.

The transistor 23 employed here can be any commonly-available type, e.g. MPSA55 PNP junction transistor or equivalent. An NPN transistor could be employed instead, simply reversing the polarities of elements such as the diode 21 and the polarized capacitor 25. Also, other types of transistors, such as JFETs could be substituted.

Figure 3:
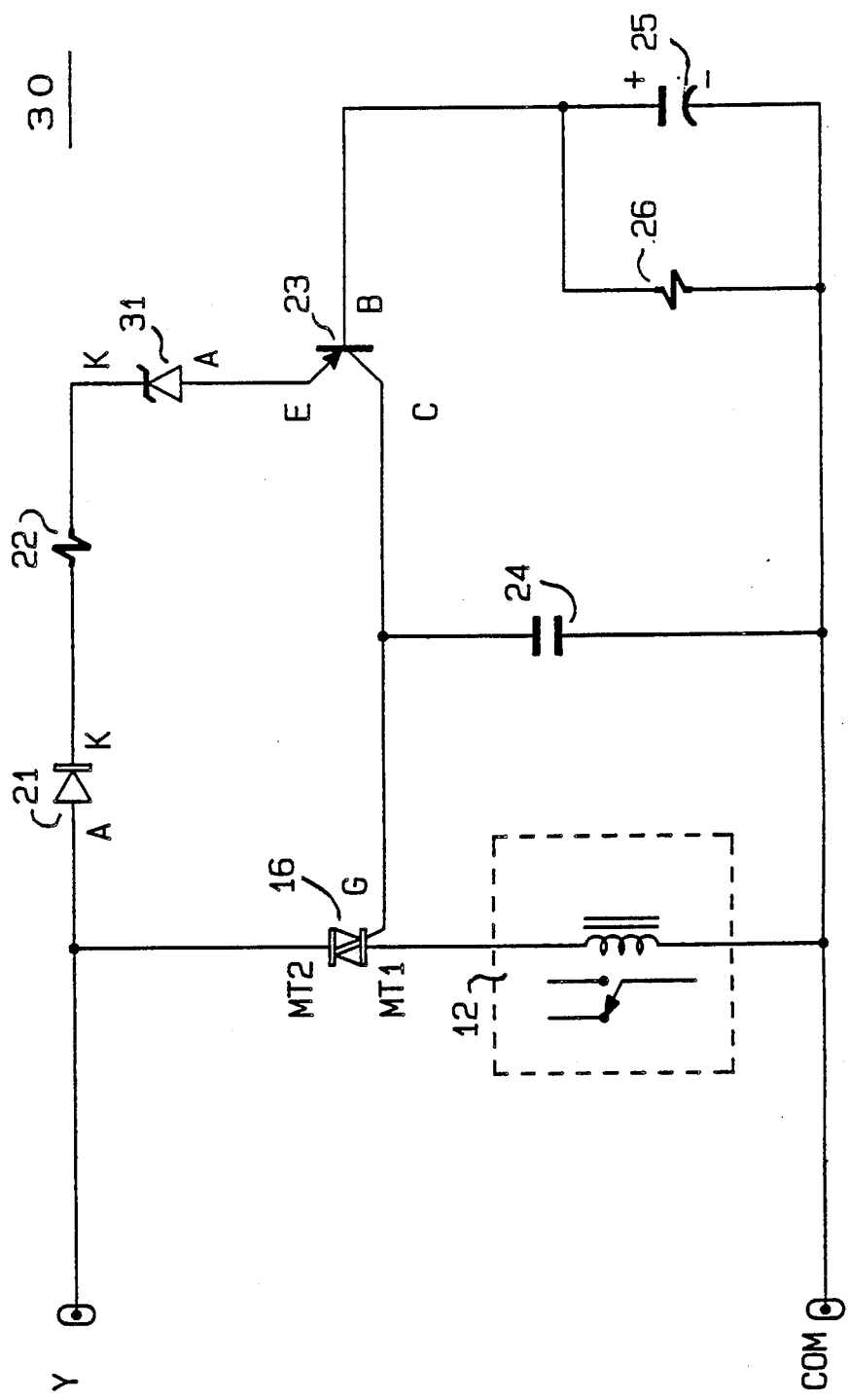
FIG. 3 shows a protective time delay circuit according to a second embodiment of this invention.

FIG. 3 shows a circuit 30 according to another embodiment of this invention, in which elements that are the same as in the previous embodiment ar identified with like reference numerals, and need not be discussed in detail. In this circuit 30, a zener diode 31 is included in series with the diode 21 and resistor 22 for more precise low-voltage or brownout protection. The thermostat voltage, nominally 24 volts AC, is derived from a transformer, and is proportional to the line voltage. To protect a 220-volt single-phase motor whose low voltage threshold is, e.g 197 volts, a zener voltage of 17 volts should provide adequate protection.

Figure 4:
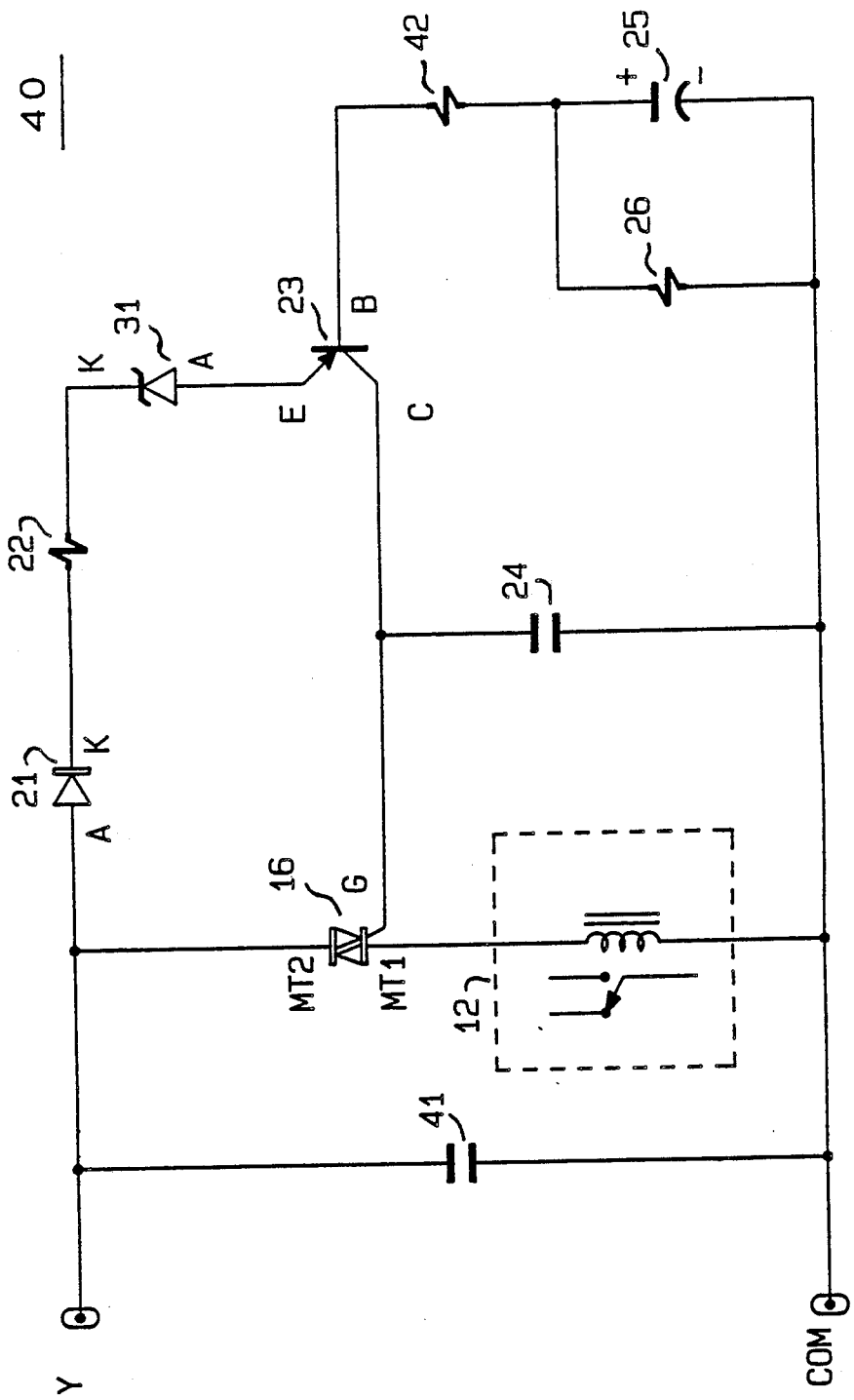
FIG. 4 shows a protective time delay circuit according to a third embodiment of this invention.

FIG. 4 shows a circuit 40 according to still another embodiment of this invention in which elements that are the same as those in the previous embodiments are identified with like reference numerals. Here a capacitor 41 is connected in parallel with the circuit formed of the triac 16 and the relay 12, between the Y conductor and the common conductor COM. This capacitor 41 provides transient protection and noise immunization. A small value resistance 42, from a few ohms to a few hundred ohms, is placed in series with the timing capacitor 25. This limits surge current through the base of the transistor 23 for surge protection.

Figure 5:
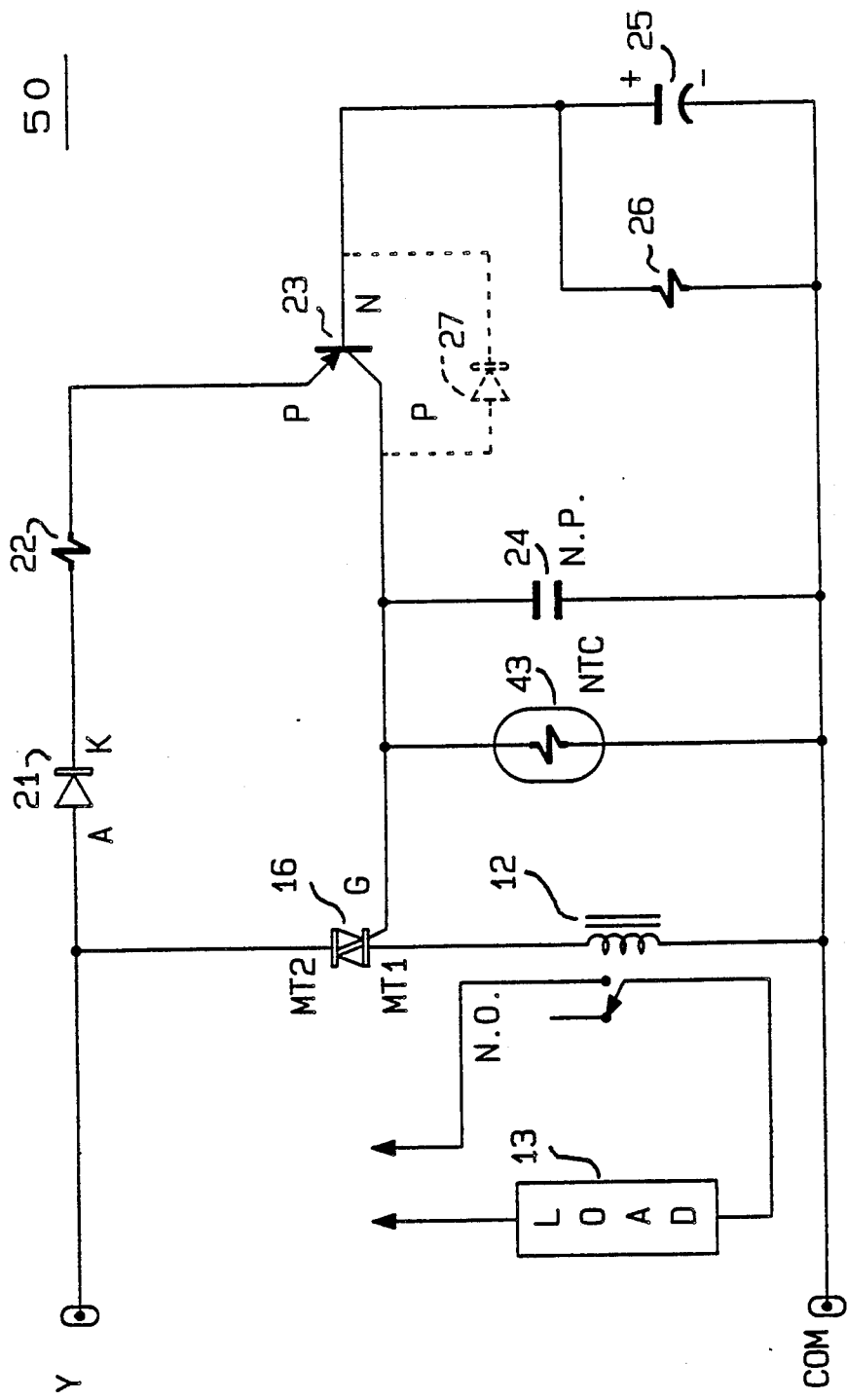
FIGS. 5 and 6 show protective time delay circuits with thermal overload protection.
Figure 6:
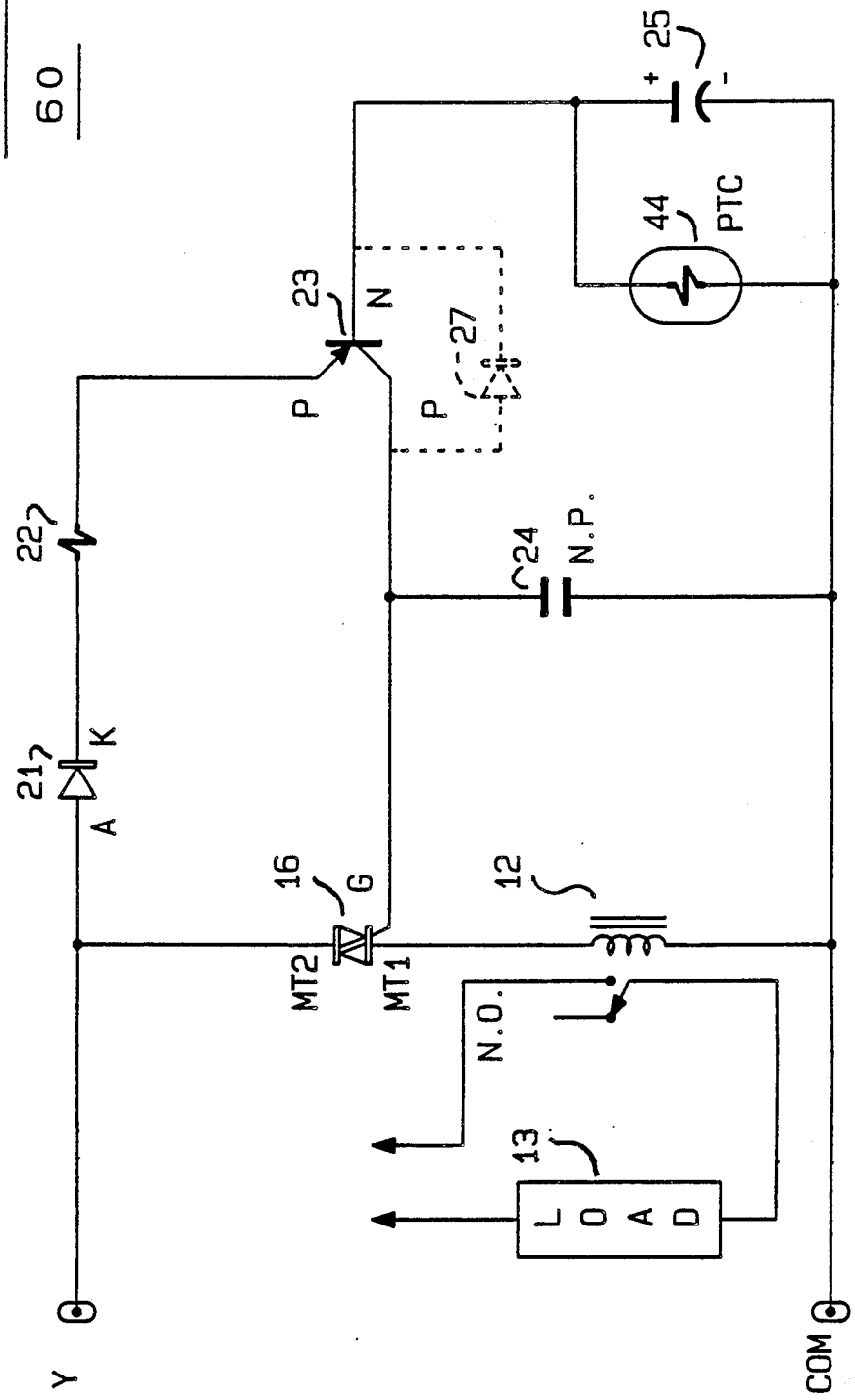

FIGS. 5 and 6 show protective circuits similar to that of FIG. 2 but with the additional feature of over-temperature protection.

In FIG. 5, a negative temperature coefficient (NTC) thermistor 43 extends in parallel with the capacitor 24, i.e., from collector of transistor 23 to the common conductor COM. In an equivalent circuit the NTC thermistor can be placed between the gate and the relay conductor of the triac 16, i.e., in series with the coil of the relay 12. The thermistor can be positioned in intimate thermal contact with the load 13 to be protected. Here, a high temperature condition will lead to bleed of charge from the capacitor 24, and will shut off the triac 16.

The circuit of FIG. 6 employs a positive temperature coefficient thermistor 44 in parallel with the timing capacitor 25. The thermistor 44 is used in place of the resistor 26, and is placed in intimate thermal contact with the load 16 to be protected. A high temperature condition will cause the delay time of the circuit 25, 44 to increase significantly. This permits the load 16 to cool before attempting a restart. The features of FIGS. 5 and 6 can be employed together.

The thermistors 43 and 44 can be remotely mounted, or the entire circuit can be placed in intimate thermal contact with the load. For example, the entire circuit can be disposed into the dust cover of an existing contactor relay, with the thermistor 43 or 44 mounted in proximity to the relay contact or thermal bus. Also, if the load is a compressor, rather than a relay connected to a compressor, the circuit can be constructed of high voltage elements, and placed in direct thermal contact with the stator of the compressor.

While the invention has been described in detail with reference to a few selected preferred embodiments, it should be understood that the invention is not limited to those precise embodiments. Rather, many modifications and variations would present themselves to those of skill in the art without departure from the scope and spirit of this invention, as defined in the appended claims.

What is claimed is

1. Protective circuit for delaying energization of a load when a voltage is applied until a predetermined time period has elapsed following a previous de-energization, comprising
   a triac having a first power electrode connected to a first ac conductor, a second power electrode connected to a load device which is in turn connected to a second ac conductor, and a gate electrode;
   a transistor having a base, electrode, an emitter electrode coupled to said first ac conductor, and a collector electrode connected to the gate of said triac;
   a latching capacitor connected between the gate of said triac and said second ac conductor; and
   a capacitor timing circuit coupled between the base of said transistor and said second ac conductor.

2. Protective circuit as in claim 1 further comprising a rectifying diode in series between said emitter electrode and said first ac conductor.

3. Protective circuit as in claim 2 further comprising a resistance in series with said rectifying diode.

4. Protective circuit as in claim 3 wherein said resistance has a value of about 10 to 1000 ohms.

5. Protective circuit as in claim 3 further comprising a zener diode connected in series between said emitter electrode and said first ac conductor.

6. Protective circuit as in claim 1 wherein said capacitive timing circuit consists of a capacitor connected between the base of said transistor and said second ac conductor.

7. Protective circuit as in claim 1 wherein said capacitive timing circuit includes a timing capacitor connected to the base of said transistor and to said second ac conductor, and a timing resistor connected to said base and to said second ac conductor in parallel with said timing capacitor.

8. Protective circuit as in claim 7 wherein said timing capacitor and timing resistor have a time constant on the order of about three to ten seconds.

9. Protective circuit as in claim 7 further including a current-limiting resistor in series with said base and said timing capacitor.

10. Protective circuit as in claim 7 wherein said timing resistor has a temperature-dependent value to provide a time constant that adjusts automatically to severe temperature conditions.

11. Protective circuit as in claim 1 further comprising a temperature sensitive resistance in parallel with said latching capacitor to provide temperature-actuated shut-off for said triac.

12. Protective circuit as in claim 1 further comprising a transient protective capacitor connected between said first and second ac conductors in parallel with a circuit formed of said triac and said load device.

13. Protective circuit as in claim 1 wherein said first and second ac conductors carry 24 volt ac thermostat control power.

14. Protective circuit as in claim 1 wherein said first and second ac conductors carry from 3 vac to 460 vac.

15. Protective circuit as in claim 7 wherein said timing capacitor and timing resistor have a time constant on the order of 0.1 seconds to ten minutes.

* * * * *

UNITED STATES PATENT AND TRADEMARK OFFICE
CERTIFICATE OF CORRECTION

PATENT NO. : 4,991,049
DATED      : February 5, 1991
INVENTOR(S) : Andrew S. Kadah It is certified that error appears in the above—identified patent and that said Letters Patent is hereby corrected as shown below:

Col. 6, line 1, after "base", please delete --,--;

line 3, after "gate", insert --electrode--;

line 5, after "gate", insert --electrode--;

line 7, after "base", insert --electrode--;

line 21, after "base", insert --electrode--;

line 25, after "base", insert --electrode--;

line 27, after "base", insert --electrode--;

line 33, after "base", insert --electrode--;

line 48, please delete --2--.

Signed and Sealed this

Twenty-fourth Day of August, 1993

Attest:

BRUCE LEHMAN

Attesting Officer    Commissioner of Patents and Trademarks

REEXAMINATION CERTIFICATE (4159th)

United States Patent [19]
Kadah

[11] B1 4,991,049
[45] Certificate Issued Sep. 26, 2000

[54] ANTI-SHORT CYCLE CIRCUIT

[75] Inventor: Andrew S. Kadah, 5000 Henneberry Rd., Manlius, N.Y. 13104

[73] Assignee: Andrew S. Kadah, Manlius, N.Y.

Reexamination Request:
No. 90/004,424, Oct. 21, 1996

Reexamination Certificate for:
Patent No.: 4,991,049
Issued: Feb. 5, 1991
Appl. No.: 07/420,310
Filed: Oct. 12, 1989

Certificate of Correction issued Aug. 24, 1993.

[51] Int. Cl.[7] ................................................ H02H 5/04
[52] U.S. Cl. ........................... 361/28; 361/22; 361/29; 361/75; 307/141; 307/141.4; 327/455
[58] Field of Search .......................... 361/23, 24, 28, 361/29, 22, 75, 93, 94, 100–101; 307/141, 141.8, 141.4; 62/157, 158, 231

[56] References Cited

U.S. PATENT DOCUMENTS

| | | | |
|---|---|---|---|
| 3,177,422 | 4/1965 | Schlereth | 321/45 |
| 3,619,668 | 11/1971 | Pinckaers | 327/397 |
| 3,633,047 | 1/1972 | Kadah et al. | 327/381 |
| 3,864,611 | 2/1975 | Chang | 361/22 |
| 4,164,861 | 8/1979 | Schlereth et al. | 73/1 G |
| 4,602,484 | 7/1986 | Bendikson | 361/22 |
| 4,807,277 | 2/1989 | Perry | 379/102 |
| 4,814,684 | 3/1989 | McCurdy | 323/222 |
| 4,817,577 | 4/1989 | Dykstra | 123/651 |
| 4,820,916 | 4/1989 | Patriquin | 250/277 |
| 4,821,023 | 4/1989 | Parks | 340/551 |
| 4,866,311 | 9/1989 | Skoutas | 307/490 |
| 4,885,510 | 12/1989 | Matthews | 315/411 |
| 5,053,710 | 10/1991 | Schlereth | 324/309 |
| 5,233,190 | 8/1993 | Schlereth et al. | 250/291 |
| 5,519,558 | 5/1996 | Ennis et al. | 361/31 |
| 5,521,789 | 5/1996 | Ohannes et al. | 361/111 |
| 5,535,086 | 7/1996 | Mentzer | 361/91 |
| 5,541,801 | 7/1996 | Lee et al. | 361/56 |
| 5,548,463 | 8/1996 | Aldridge et al. | 361/18 |
| 5,550,700 | 8/1996 | Moore et al. | 361/101 |
| 5,561,576 | 10/1996 | Baldwin | 361/41 |
| 5,657,194 | 8/1997 | Waltz | 361/75 |
| 5,696,661 | 12/1997 | Vieira et al. | 361/200 |

OTHER PUBLICATIONS

General Electric SCR Manual, Sixth Edition, 1979, § 8.2.3 "Alternate Connections for Full Wave AC Static Switching", pp 197–198.
*Webster's Ninth New Collegiate Dictionary*, Merriam–Webster, Inc., 1987, pp 278 and 298.
*Electronic Circuits*, Angelo, Jr., McGraw–Hill Inc., 1964, p. 194.
E. J. Angelo, Jr., Electronics Circuits, Second Ed. (Mc Graw Hill, New York) 1964, pp. 191 to 194.
McGraw–Hill Dictionary of Scientific and Technical Terms, Fourth Ed. (McGraw Hill, New York) 1989, p. 445.
SSAC Precision Products, Circuit Diagram Part No. TA, Jan. 23, 1981.
D'Antonio, Schematics of Watsco EAC–511 and EAC–650, Feb. 24, 1993.
ICM BLKS Schematic, Dwg. No. A2881, 1988.
Omnetics, AMS–1 Circuit Diagram, 1982.
Spofford, W. R., Jr., The D13T—A Programmable Unijunction Transistor Types 2N6027 and 2N6028, General Electric Semiconductor Products Dept., Auburn, NY 1967.
Radio Shack Dictionary of Electronics, Graf, 1974.
The New IEEE Standard Dictionary of Electrical and Electronics Terms, Fifth Edition, p. 277, 1992.
Solid State Advanced Controls, "SSAC" eighth addition, exhibit 10 TA Series (Brochure) (date unknown).

*Primary Examiner*—Michael J. Sherry

[57] ABSTRACT

A protective time delay delay circuit delays energization to an electric load until a predetermined time has elapsed from a previous deenergization. A transistor has its emitter connected to an ac conductor and has its base coupled to an RC timing circuit. The collector is connected to the gate of a triac whose current electrodes are coupled to the thermostat conductor and to a load device. A small resistor and a zener can be connected to the transistor to provide brownout protection. A temperature sensitive resistor can be included to increase or decrease the lockout period as a function of temperature. This resistor can be remotely mounted in thermal proximity to the load to be protected. A thermistor placed in parallel to latching capacitor can provide thermal overload protection.

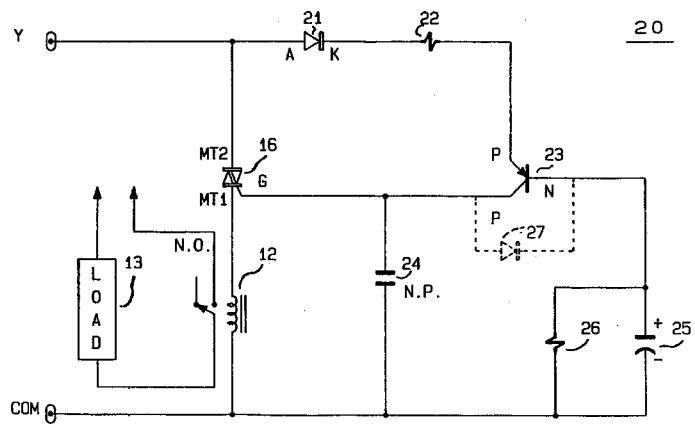

B1 4,991,049

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 12–14 are cancelled.

Claims 2, 6, 7 and 11 are determined to be patentable as amended.

Claims 3–5, 8–10 and 15, dependent on an amended claim, are determined to be patentable.

2. Protective circuit [as in claim 1 further comprising] *for delaying energization of a load when a voltage is applied until a predetermined time period has elapsed following a previous de-energization, comprising:*
   *a triac having a first power electrode connected to a first ac conductor, a second power electrode connected to a load device which is in turn connected to a second ac conductor, and a gate electrode;*
   *a transistor having a base electrode, an emitter electrode coupled to said first ac conductor, and a collector electrode connected to the gate electrode of said triac;*
   *a latching capacitor connected between the gate electrode of said triac and said second ac conductor;*
   *a capacitor timing circuit coupled between the base electrode of said transistor and said second ac conductor; and*
   a rectifying diode in series between said emitter electrode and said first ac conductor.

6. Protective circuit [as in claim 1] *for delaying energization of a load when a voltage is applied until a predetermined time period has elapsed following a previous de-energization, comprising:*
   *a triac having a first power electrode connected to a first ac conductor, a second power electrode connected to a load device which is in turn connected to a second ac conductor, and a gate electrode;*
   *a transistor having a base electrode, an emitter electrode coupled to said first ac conductor, and a collector electrode connected to the gate electrode of said triac;*
   *a latching capacitor connected between the gate electrode of said triac and said second ac conductor;*
   *a capacitor timing circuit coupled between the base electrode of said transistor and said second ac conductor;*
   wherein said [capacitive] *capacitor* timing circuit consists of a capacitor connected between the base *electrode* of said transistor and said second ac conductor.

7. Protective circuit [as in claim 1] *for delaying energization of a load when a voltage is applied until a predetermined time period has elapsed following a previous de-energization, comprising:*
   *a triac having a first power electrode connected to a first ac conductor, a second power electrode connected to a load device which is in turn connected to a second ac conductor, and a gate electrode;*
   *a transistor having a base electrode, an emitter electrode coupled to said first ac conductor, and a collector electrode connected to the gate electrode of said triac;*
   *a latching capacitor connected between the gate electrode of said triac and said second ac conductor;*
   *a capacitor timing circuit coupled between the base electrode of said transistor and said second ac conductor;*
   wherein said [capacitive] *capacitor* timing circuit includes a timing capacitor connected to the base *electrode* of said transistor and to said second ac conductor, and a timing resistor connected to said base *electrode* and to said second ac conductor in parallel with said timing capacitor.

11. Protective circuit [as in claim 1 further comprising] *for delaying energization of a load when a voltage is applied until a predetermined time period has elapsed following a previous de-energization, comprising:*
    *a triac having a first power electrode connected to a first ac conductor, a second power electrode connected to a load device which is in turn connected to a second ac conductor, and a gate electrode;*
    *a transistor having a base electrode, an emitter electrode coupled to said first ac conductor, and a collector electrode connected to the gate electrode of said triac;*
    *a latching capacitor connected between the gate electrode of said triac and said second ac conductor;*
    *a capacitor timing circuit coupled between the base electrode of said transistor and said second ac conductor; and*
    a temperature sensitive resistance in parallel with said latching capacitor to provide temperature-actuated shut-off for said triac.

\* \* \* \* \*